United States Patent [19]

Moretto et al.

[11] 4,202,807

[45] May 13, 1980

[54] ORGANOPOLYSILOXANE COMPOSITIONS MODIFIED WITH POLYURETHANE

[75] Inventors: Hans-Heinrich Moretto, Cologne; Armand de Montigny; Helmut Steinberger, both of Leverkusen; Hans Sattlegger, Odenthal-Gloebusch, all of Fed. Rep. of Germany; Ingrid Larking, Landvetter, Sweden

[73] Assignee: Bayer Aktiengesellschaft, Leverkusen, Fed. Rep. of Germany

[21] Appl. No.: 917,717

[22] Filed: Jun. 21, 1978

[30] Foreign Application Priority Data

Jul. 7, 1977 [DE] Fed. Rep. of Germany ....... 2730744

[51] Int. Cl.$^2$ .................... C08L 75/04; C08L 83/04
[52] U.S. Cl. ............................ 260/29.1 SB; 525/453; 525/474; 528/28; 528/48
[58] Field of Search ................... 260/824 R, 29.1 SB; 528/28, 48

[56] References Cited

U.S. PATENT DOCUMENTS

| 3,388,101 | 6/1968 | Wismer et al. | 260/528.28 |
| 3,708,467 | 1/1973 | Smith et al. | 260/824 R |

Primary Examiner—Wilbert J. Briggs, Sr.
Attorney, Agent, or Firm—Sprung, Felfe, Horn, Lynch & Kramer

[57] ABSTRACT

Polyurethane is present as a solid phase in a liquid polyorganosiloxane, preferably being formed therein by mixing a polyhydroxy-containing material with the polysiloxane followed by addition of a polyisocyanate. If the polyorganosiloxane contains hydroxyl groups it can be chemically bonded to the polyurethane. The composition can be cured to solid plastic masses of superior properties by adding a curing agent for the polysiloxane.

6 Claims, No Drawings

ORGANOPOLYSILOXANE COMPOSITIONS MODIFIED WITH POLYURETHANE

Organopolysiloxanes modified with inorganic and organic materials are in themselves known. Thus, organopolysiloxanes, or mixtures of organopolysiloxanes, mixed with inorganic fillers, such as, for example, silicon dioxide aerogels, diatomaceous earth, magnesium and/or iron oxide, with additional crosslinking agents and processing auxiliaries are used in many fields. These include, for example, the use of so-called one-component or two-component systems which cure under the action of moisture, curing being effected by the reaction of siloxanes containing OH functional groups with crosslinking and curing catalysts, such as, for example, alkyl silicates or alkyltriacyloxysilanes as well as water. Further known crosslinking systems are based on the reaction of siloxanes containing Si-H with unsaturated compounds in the presence of catalytically active peroxides.

The inorganic and organic modifying agents already mentioned impart different characteristics to the organopolysiloxane compositions formed therewith. Organopolysiloxanes modified with organic materials, usually polymers, include, for example, block copolymers, in which organopolysiloxane blocks are chemically linked to organic polymer blocks (for example polyethers, polycarbonates, polycarbodiimides or polyurethanes). Products of this type are described, for example, in U.S. Pat. No. 3,402,192, U.S. Pat. No. 3,701,815, U.S. Pat. No. 3,189,662, German Offenlegungsschrift (German Published Specification) 2,445,220 and German Offenlegungsschrift (German Published Specification) 2,543,966. These products are in general prepared via multi-stage processes.

Moreover, modified organopolysiloxane compositions which form by free radical polymerization of unsaturated organic monomers in organopolysiloxanes or by mixing corresponding constituents have been disclosed. The products which form are in some cases only compositions filled with organic polymer particles (for example a polyolefin or polystyrene) and in some cases also products in which the organic polymer is partially bonded to the siloxane by grafting. Compositions of this type and processes for their preparation are described, for example, in U.S. Pat. No. 2,965,593 and U.S. Pat. No. 3,627,836.

The properties of these last-mentioned products are, however, still unsatisfactory for a number of applications. The polymers which have been disclosed for filling or grafting are formed from one or more unsaturated monomers which are polymerizable, such as, for example, ethylene, vinyl chloride or 1,3-butadiene.

These organic polymers as a rule have a low stability to high temperatures. They impart this adverse property to the cured organopolysiloxane compositions formed therefrom. In addition, they have adverse elastomer properties, such as, for example, high permanent set. Furthermore, they considerably impair the mechanical properties at elevated temperature (for example the tensile strength). The long term stability to heat, which otherwise is a distinguishing feature of the organopolysiloxanes, is lost.

It is therefore an object of the present invention to provide improved organopolysiloxane compositions which, also for economic and technical reasons, meet the condition that they can be prepared without high expenditure on technical apparatus and without a long reaction time and that the compositions prepared are capable of flow without the use of solvents and are adequately stable on storage. After vulcanization has taken place, the compositions should cure tack-free and be distinguished, compared with other organically modified organopolysiloxane compositions, by improved mechanical properties at elevated temperatures.

The present invention relates to polysiloxanes modified with polyurethane, which are characterized in that the polysiloxane and polyurethane are present as discernible phases, in some cases with partial chemical and/or physical bonding to one another. The polyurethane is produced in a manner which is in itself known, by a polyaddition reaction of di- or poly-isocyanates of the general formula

in which

R' represents an optionally substituted alkylene or arylene radical with preferably up to 24 C atoms, with diols or polyols or polymers containing hydroxyl groups, in organopolysiloxane liquids.

The improved organopolysiloxane compositions according to the present invention are thus to be regarded as organopolysiloxane mixtures filled with polyurethane, which mixtures comprise the following two phases: (i) a coherent phase of an organopolysiloxane liquid and (ii) a non-coherent phase of finely divided particles of a polyurethane polymer which has been obtained by a polyaddition reaction of the corresponding monomer or mixture of monomers in the presence of the organopolysiloxane liquid and of a catalyst which accelerates the formation of the polyurethane. Advantageously the polyurethane is present in about 3–95% by weight of the total mixture and preferably about 40–80% and more preferably 45–55% by weight.

The organopolysiloxane compositions, filled with polyurethane, of the present invention are prepared by intensive mixing of the organopolysiloxane liquid with a diol or polyol, or mixtures thereof, and subsequent addition of a diisocyanate to this mixture.

The organopolysiloxane liquids preferred for the use according to the invention are characterized by the following formula:

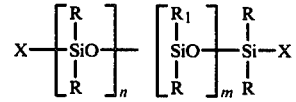

in which

R represents an optionally substituted alkyl, alkenyl, aryl or halogenoalkyl radical with up to about 10 C atoms, $R_1$ represents hydrogen or an optionally substituted alkyl, alkenyl, aryl or halogenoalkyl radical with up to about 10 C atoms;

X is, for example, hydroxyl-, vinyl or methyl-;

n=2 to about 1,000 and m=1 to about 50.

Mixtures of different polysiloxanes can also be used. Furthermore, silicone resins such as are obtainable, for example, by cohydrolysis of methyltrichlorosilane and dimethyldichlorosilane are also suitable for the use according to the invention, on their own or as a mixture with the organopolysiloxanes mentioned.

The starting components to be employed according to the invention can be aliphatic, cycloaliphatic, araliphatic, aromatic and heterocyclic polyisocyanates, such as are described, for example, by W. Siefgen in Justus Liebigs Annalen der Chemie, 562, pages 75 to 136, for example ethylene diisocyanate, 1,4-tetramethylene diisocyanate, 1,6-hexamethylene diisocyanate, 1,12-dodecane diisocyanate, cyclobutane 1,3-diisocyanate, cyclohexane 1,3- and 1,4-diisocyanate and also any desired mixtures of these isomers, 1-isocyanato-3,3,5-trimethyl-5-isocyanatomethyl-cyclohexane (German Auslegeschrift (German Published Specification) 1,202,785), 2,4- and 2,6-hexahydrotoluylene diisocyanate and also any desired mixtures of these isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-toluylene diisocyanate and also any desired mixtures of these isomers, diphenylmethane 2,4'- and/or 4,4'-diisocyanate, naphthylene 1,5-diisocyanate, triphenylmethane 4,4',4''-triisocyanate, polyphenyl-polymethylene polyisocyanates such as are obtained by an aniline/formaldehyde condensation reaction and subsequent phosgenation and are described, for example, in British Patent Specifications 874,430 and 848,671, perchlorinated aryl polyisocyanates such as are described, for example, in German Auslegeschrift (German Published Specification) 1,157,601, polyisocyanates containing carbodiimide groups such as are described in German Patent Specification No. 1,092,007, diisocyanates such as are described in U.S. Pat. No. 3,492,330, polyisocyanates containing allophanate groups such as are described, for example, in British Patent Specification No. 994,890, Belgian Patent Specification No. 761,626 and Netherlands Published Patent Application No. 7,102,524, polyisocyanates containing isocyanurate groups such as are described, for example, in German Patent Specification Nos. 1,022,789, 1,222,067 and 1,027,394 and also in German Offenlegungsschriften (German Published Specifications) 1,929,034 and 2,004,048, polyisocyanates containing urethane groups such as are described, for example, in Belgian Patent Specification No. 752,261 or in U.S. Pat. No. 3,394,164, polyisocyanates containing acylated urea groups according to German Patent Specification 1,230,778, polyisocyanates containing biuret groups such as are described, for example, in German Patent Specification No. 1,101,394, in British Patent Specification No. 889,050 and in French Patent Specification No. 7,017,514, polyisocyanates prepared by telomerization reactions such as are described, for example, in Belgian Patent Specification No. 723,640, polyisocyanates containing ester groups such as are mentioned, for example, in British Patent Specifications Nos. 965,474 and 1,072,956, in U.S. Pat. No. 3,567,763 and in German Patent Specification No. 1,231,688, and reaction products of the abovementioned isocyanates with acetals according to German Patent Specification No. 1,072,385.

It is also possible to employ the distillation residues, containing isocyanate groups, which are obtained from the industrial preparation of isocyanates, optionally dissolved in one or more of the abovementioned polyisocyanates. Furthermore, it is possible to use any desired mixtures of the abovementioned polyisocyanates.

As a rule, the polyisocyanates which are industrially readily available are preferred, for example 2,4- and 2,6-toluylene diisocyanate and also any desired mixtures of these isomers ("TDI"), polyphenyl-polymethylene polyisocyanates, such as are prepared by an aniline/formaldehyde condensation reaction and subsequent phosgenation ("crude MDI") and polyisocyanates containing carbodiimide groups, urethane groups, allophanate groups, isocyanurate groups, urea groups or biuret groups ("modified polyisocyanates").

Examples of these particularly preferred polyisocyanates are 4,4'-diphenylmethane diisocyanate liquefied by partial carbodiimidation, such as is obtainable, for example, according to German Patent Specification No. 1,568,501 by heating in the presence of 2.5 mol% of urea to 225° C. for 1–2 hours, or "liquefied" 4,4'-diphenylmethane diisocyanate obtainable by reaction of 1 mol of 4,4'-diphenylmethane diisocyanate with about 0.1–0.3 mol of di- or poly-propylene glycol having a maximum molecular weight of 700.

Starting components to be employed according to the invention are also optionally compounds containing at least two hydrogen atoms which are reactive towards isocyanates and having a molecular weight of about 62–10,000. These compounds are understood as, in addition to compounds containing amino groups, thiol groups or carboxyl groups, preferably polyhydroxy compounds, especially compounds containing two to eight hydroxyl groups, and specifically those having a molecular weight of about 200 to 10,000 and preferably about 1,000 to 6,000, for example polyesters, polyethers, polythioethers, polyacetals, polycarbonates and polyester-amides containing at least two, and up to about 8, but preferably up to about 4, hydroxyl groups, such as are in themselves known for the preparation of homogeneous polyurethanes and cellular polyurethanes. In the process according to the invention, the said polyhydroxy compounds of relatively high molecular weight are frequently advantageously employed as a mixture with up to about 95, and preferably up to about 50, percent by weight, based on the total amount of polyhydroxy compounds, of low molecular weight polyols having a molecular weight range of about 62–200. Low molecular weight polyols of this type are, for example, ethylene glycol, 1,2-propanediol, 1,3-propanediol, 1,2-butanediol, 1,4-butanediol, 1,6-hexanediol, 1,10-decanediol, diethylene glycol, triethylene glycol, tetraethylene glycol, dipropylene glycol, tripropylene glycol, glycerol, trimethylolpropane and the like.

The polyesters containing hydroxyl groups which can be used are, for example, reaction products of polyhydric, preferably dihydric and in some cases additionally trihydric alcohols with polybasic, preferably dibasic, carboxylic acids. In place of the free polycarboxylic acids, the corresponding polycarboxylic acid anhydrides or corresponding polycarboxylic acid esters of lower alcohols, or mixtures thereof, can also be used to prepare the polyesters. The polycarboxylic acids can be of an aliphatic, cycloaliphatic, aromatic and/or heterocyclic nature and be optionally substituted, for example by halogen atoms, and/or unsaturated. Examples of such compounds which may be mentioned are: succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric and trimeric fatty acids, such as oleic acid, optionally mixed with monomeric fatty acids, terephthalic acid dimethyl ester and terephthalic acid bisglycol ester. Polyhydric alcohols which can be used are, for example, ethylene glycol, propylene 1,2- and 1,3-glycol, butylene 1,4- and 2,3-glycol, hexane-1,6-diol, octane-1,8-diol, neopentylglycol, cyclohexanedimethanol (1,4-bis-hydroxymethylcyclohexane), 2-methyl-1,3-propanediol, glycerol, trimethylolpropane, hexane-1,2,6-triol, butane-1,2,4-triol, trimethylolethane, pentaerythritol, quinitol, mannitol and sorbitol, methyl glycoside and also diethylene glycol, triethylene glycol, tetraethylene glycol, polyethylene glycols, dipropylene glycol, polypropylene glycols, dibutylene glycol and polybutylene glycols. The polyesters can also contain a proportion of terminal carboxyl groups. Polyesters obtained from lactones, for example ε-caprolactone, or hydroxycarboxylic acids, for example ω-hydroxycaproic acid, can also be employed.

The polyethers containing at least two, as a rule two to eight and preferably two to three hydroxyl groups, which can be used according to the invention, are also those of the type which is in itself known and are prepared, for example, by homopolymerization of epoxides, such as ethylene oxide, propylene oxide, butylene oxide, tetrahydrofuran, styrene oxide or epichlorohydrin, for example in the presence of $BF_3$, or by an addition reaction of these epoxides, optionally as a mixture or successively, with starting components containing reactive hydrogen atoms, such as alcohols or amines, for example water, ethylene glycol, propylene 1,3- or 1,2-glycol, trimethylolpropane, 4,4'-dihydroxydiphenylpropane, aniline, ammonia, ethanolamine or ethylenediamine. Sucrose polyethers, such as are described, for example, in German Auslegeschriften (German Published Specifications) 1,176,358 and 1,064,938, can also be used according to the invention. Frequently, those polyethers which contain in the main primary OH groups (up to 90% by weight relative to all of the OH groups present in the polyether) are preferred. Polyethers modified by vinyl polymers, such as are formed, for example, by polymerization of styrene and acrylonitrile in the presence of polyethers (U.S. Pat. Spec. Nos. 3,383,351, 3,304,273, 3,523,093 and 3,110,695 and German Patent Specification 1,152,536) are also suitable, as are polybutadienes containing OH groups.

Amongst the polythioethers, the condensation products of thiodiglycol with itself and/or with other glycols, dicarboxylic acids, formaldehyde, aminocarboxylic acids or aminoalcohols may be mentioned in particular. Depending on the alchols may be mentioned in particular. Depending on the co-components, the products are polythio mixed ethers, polythioether-esters or polythioether-ester-amides.

Polyacetals which can be used are, for example, the compounds which can be prepared from glycols, such as diethylene glycol, triethylene glycol, 4,4'-dihydroxyethoxy-diphenyldimethylmethane or hexanediol and formaldehyde. Polyacetals which are suitable according to the invention can also be prepared by polymerization of cyclic acetals.

Polycarbonates, containing hydroxyl groups, which can be used are those of the type which is in itself known, which can be prepared, for example, by reacting diols, such as propane-1,3-diol, butane-1,4-diol and/or hexane-1,6-diol, diethylene glycol, triethylene glycol or tetraethylene glycol, with diaryl carbonates, for example diphenyl carbonate or phosgene.

The polyester-amides and polyamides include, for example, the predominantly linear condensation products obtained from polybasic saturated and unsaturated carboxylic acids or the anhydrides thereof and polyhydric saturated and unsaturated aminoalcohols, diamines, polyamines and mixtures thereof.

Polyhydroxy compound which already contain urethane or urea groups, and also optionally modified natural polyols, such as castor oil, carbohydrates and starch can also be used. Addition products of alkylene oxides with phenol/formaldehyde resins or with urea/formaldehyde resins can also be employed according to the invention.

Representatives of these compounds to be used according to the invention are described, for example, in High Polymers, volume XVI, "Polyurethanes, Chemistry and Technology," edited by Saunders-Frisch, Interscience Publishers, New York, London, volume I, 1962, pages 32-42 and pages 44-54 and volume II, 1964, pages 5-6 and 198-199 and also in Kunststoff-Handbuch (Plastics Handbook), Volume VII, Vieweg-Höchtlen, Carl-HanserVerlag, Munich, 1966, for example on pages 45 to 71.

In the process according to the invention, the reactants are employed in ratios which corresponds to a NCO number of 70-160. (A NCO number of 100 signifies that equivalent numbers of isocyanate groups and active hydrogen atoms which enter into reaction with these isocyanate groups are present in the reaction mixture).

Furthermore, according to the invention catalysts are frequently additionally used. Possible catalysts to be additionally used are those of the type which is in itself known, for example tertiary amines, such as triethylamine, tributylamine, N-methyl-morpholine, N-ethyl-morpholine, N-coconut alkyl-morpholine, N,N,N',N'-tetramethyl-ethylenediamine, 1,4-diaza-bicyclo-(2,2,2)-octane, N-methyl-N'-dimethyl-amino-ethyl-piperazine, N,N-dimethylbenzylamine, bis-(N,N-diethylaminoethyl) adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole and 2-methylimidazole.

Tertiary amines containing hydrogen atoms which are active towards isocyanate groups are, for example, triethanolamine, triisopropanolamine, N-methyl-diethanolamine, N-ethyldiethanolamine, N,N-dimethylethanolamine and also the reaction products thereof with alkylene oxides, such as propylene oxide and/or ethylene oxide.

Further catalysts which can be used are silaamines containing carbon-silicon bonds, such as are described, for example, in German Patent Specification 1,229,290, for example 2,2,4-trimethyl-2-silamorpholine and 1,3-diethylaminomethyltetramethyl-disiloxane.

Nitrogen-containing bases, such as tetraalkylammonium hydroxides, and also alkali metal hydroxides, such as sodium hydroxide, alkali metal phenolates, such as sodium phenolate, or alkali metal alcoholates, such as sodium methylate, can also be used as catalysts. Hexahydrotriazines can also be employed as catalysts.

According to the invention, organic metal compounds, especially organic tin compounds, can also be used as catalysts.

Organic tin compounds which can be used as preferably tin-II salts of carboxylic acids, such as tin-II acetate, tin-II octoate, tin-II ethylhexoate and tin-II laurate, and the dialkyl-tin salts of carboxylic acids, such as, for example, dibutyl-tin diacetate, dibutyl-tin dilaurate, dibutyl-tin maleate or dioctyl-tin diacetate.

Further representatives of catalysts to be used according to the invention and details regarding the mode of action of the catalysts are described in Kunststoff-Handbuck (Plastics Handbook), volume VII, published by Vieweg and Höchtlen, Carl-Hanser-Verlag, Munich, 1966, for example on pages 96 to 102.

As a rule, the catalysts are employed in an amount of between about 0.001 and 10% by weight, based on the amount of compounds containing at least two hydrogen atoms which are reactive towards isocyanates and having a molecular weight of 62 to 10,000.

According to the invention, surface-active additives (emulsifiers and foam stabili ers) can also additionally be used. Emulsifiers which can be used are, for example, the sodium salts of castor oil sulphonates or of fatty acids or salts of fatty acids with amines, such as the diethylamine salt of oleic acid or the diethanolamine salt of stearic acid. Alkali metal salts or ammonium salts of sulphonic acids, such as, say, of dodecylbenzenesulphonic acid or dinaphthylmethanedisulphonic acid, or of fatty acids, such as ricinoleic acid, or of polymeric fatty acids can also additionally be used as surface-active additives.

Further examples of surface-active additives and foam stabilizers, and also cell regulating agents, reaction retarders, stabilizers, flame retardant substances, plasticizers, dyestuffs and fillers, as well as substances having a fungistatic and bacteriostatic action, which are optionally additionally to be used according to the invention, and also details regarding the way in which these additives are used, and their mode of action, are described in Kunststoff-Handbuch (Plastics Handbook), volume VI, published by Vieweg and Höchtlen, Carl-Hanser-Verlag, Munich, 1966, for example on pages 103 to 113.

Surprisingly, the mixtures according to the invention are stable. They are suitable for the preparation of molding compositions which can be cured to give elastomers.

In general, most of the solid particles (more than about 80%) of the homopolymer or copolymer have an average diameter of about 0.3 to 10 microns and a few of the particles have a diameter of less than 0.3 micron.

The polyurethane-modified polysiloxane liquids according to the invention are advantageously prepared by mixing an $\alpha,\omega$-dihydroxypolysiloxane with a diol, polyol or polyether-ol at room temperature or elevated temperature (up to about 150° C.), adding the catalyst and metering in the corresponding amount of isocyanate or isocyanate mixture at a uniform rate and continuously in the course of a preset time. The addition of the isocyanate or of the isocyanate mixture is preferably effected at temperatures of about 60° to 120° C.

The rate of the addition of the isocyanate (about 1–8 hours - depending on the batch size) is generally so regulated that the heat of reaction which is liberated can be removed and the desired reaction temperature is kept constant.

During the preparation procedure, the viscosity of the mixture rises considerably. The extent of the rise in the viscosity is dependent on the initial viscosity of the siloxane component used, on the degree of filling by the polyurethane produced and on the degree of distribution of the discontinuous phase.

The state of fine division of the polyurethane phase distributed in the organosiloxane phase depends on the stirring speed and the construction of the stirred used, on the reaction temperature and on the viscosity of the organosiloxane phase.

The resulting polyurethane-modified polysiloxanes are white, usually non-transparent, flowable and cross-linkable compositions of medium to high viscosity which can be cured by many of the customary catalysts which are suitable for the silanol condensation.

Suitable crosslinking agents are those substances which are conventionally employed for the preparation of one-component or two-component systems. Examples of such substances which can be used are alkoxysilicon compounds, tetraalkoxysilanes, alkyl polysilicates and acyloxysilicon compounds.

The preparation of one-component or two-component compositions based on polyurethane/polysiloxane copolymers is effected by mixing the polyurethane/siloxane composition with the crosslinking component and optionally the fillers and/or plasticizers in a commercially available mixer or kneader. Fillers which can be used are, for example, ground quartz, chalk or diatomaceous earth or pyrogenic $SiO_2$ produced in the gas phase or other finely divided metal oxides, such as, for example, $TiO_2$ or $Fe_2O_3$.

As mentioned, plasticizers can optionally be added. The plasticizers employed are liquid inert polydiorganosiloxanes, for example polydimethylsiloxanes stopped by $\alpha,\omega$-trimethyl-siloxy end groups.

The water required for vulcanizing the copolymers can be supplied by atmospheric humidity or by direct mixing into the curable copolymer formulations.

As mentioned, polyurethane-modified organopolysiloxane compositions can be used either in bulk on their own or as an additive in other polymer compositions.

They are distinguished by improved properties in respect of the stability to high temperatures, the tensile strength at elevated temperature, lower permanent set and good adhesion (of the cured products) on glass, concrete, stone and metals.

The invention is illustrated in more detail in the following examples. Unless expressly stated otherwise, the percentage data given below denote percentages by weight.

EXAMPLE 1

This example describes the preparation of a dispersion of 50% of a polyurethane based on toluylene diisocyanate and dipropylene glycol in a molar ratio of 1:1 and 50% of $\alpha,\omega$-dihydroxypolydimethylsiloxane.

A mixture of 620 g of polydimethylsiloxane with terminal hydroxyl groups and a viscosity of 18,000 centipoise (20° C.) and 270 g of dipropylene glycol (mixture of isomers) is warmed to 80° C. and a mixture of 349.5 g of toluylene diisocyanate (mixture of isomers comprising 80% of 2,4-toluylene diisocyanate and 20% of 2,6-toluylene diisocyanate) and 1.8 g of triethylamine is metered in at a uniform rate in the course of one hour, while stirring. The reaction temperature is kept between 80° and 90° C. during the period of the addition. After the addition has ended, the mixture is stirred for a further one hour and then cooled. This gives a white, highly viscous composition (Eta=$2 \times 10^6$ cP), the further processing of which is described in more detail in Example 6.

In order to prepare a cold-curing film, 50 g of this composition are cured with 2.5 g of ethyltriacetoxysilane and 0.4 g of dibutyl-tin dilaurate. An elastic product with a Shore A hardness of 32 is obtained.

EXAMPLE 2

A mixture of 1,500 g of the polydimethylsiloxane of Example 1 and 804 g of dipropylene glycol is heated to 80° C. and a mixture of 696 g of the toluylene diisocyanate of Example 1 and 3.5 g of triethylamine is added in the course of one hour at 80° C., while stirring. The molar ratio of isocyanates in the toluylene diisocyanate and hydroxyl groups in the dipropylene glycol is 1:2.

After the addition has ended, the mixture is stirred for 1 hour at 80° C. and then cooled.

The resulting yellowish-white product has a viscosity of 217,000 cP (20° C.).

A film prepared from this composition, and cured, according to Example 1, has a Shore A hardness of 45.

EXAMPLE 3

A mixture of 1,500 g of the polymethylsiloxane of Example 1 and 909.5 g of dipropylene glycol is heated to 80° C. and a mixture of 800.6 g of the toluylene diisocyanate of Example 1 and 2.9 g of triethylamine is added in the course of one hour at 80° C., while stirring. The molar ratio of isocyanate groups in the toluylene diisocyanate and hydroxyl groups in the dipropylene glycol is 1:2.

After the addition had ended, the mixture is stirred for 1 hour at 80° C. and then cooled.

The resulting white product has a viscosity of 230,000 cP (20° C.).

A film prepared from this composition, and cured, according to Example 1, has a Shore A hardness of 11.

EXAMPLE 4

If, in place of a polydimethylsiloxane having a viscosity of 18,000 cP (20° C.), a polydimethylsiloxane having a viscosity of 10,000 cP (20° C.) is used analogously to Example 3, the resulting polyurethane-modified composition has a viscosity of 85,000 cP (20° C.). A film prepared therefrom according to Example 1 has a Shore A hardness of 13.

EXAMPLE 5

368.5 g of dipropylene glycol are dissolved in 600 ml of dry toluene and a mixture of 239.2 g of the toluylene diisocyanate of Example 1 and 2.8 g of triethylamine is added at 80° C. in the course of one hour, while stirring. After the addition has ended, the solvent is distilled. This gives a yellowish viscous composition, the further processing of which is described in more detail in Example 6.

EXAMPLE 6

A mixture of 1,200 g of the product from Example 1, 600 g of the product from Example 4 and 600 g of the polydimethylsiloxane of Example 1 are mixed for 2 hours at 70° C.

The white, flowable composition obtained therefrom has a viscosity of 300,000 cP. The size of the disperse particles was determined as being about 1 to 2.5 microns.

The formulation of a cold-curing composition and also the properties of the cured product are given in Example 10, Table 1 (one-component system) and Table 2 (two-component system).

EXAMPLE 7

A solution of 402 g of trimethylolpropane and 576 g of the polydimethylsiloxane of Example 1 in 1,150 g of dry toluene is warmed 80° C. and a mixture of 174 g of the toluylene diisocyanate of Example 1 and 5 g of triethylemine is added at 80° to 100° C. in the course of 2 hours, whil stirring. After distilling off the solvent, a white composition is obtained which is further used in Example 8.

EXAMPLE 8

A mixture of 50% of the product from Example 1 and 50% of the product from Example 7 gives a white dispersion which is capable of flow and has a viscosity of 300,000 cP (20° C.). The average particle size of the disperse polyurethane particles was found to be 1 to 2 microns.

The formulation of a cold-curing composition and also the properties of the cured product are given in Example 9, Table 1 (one-component system) and Table 2 (two-component system).

EXAMPLE 9

This example gives a summary of the formulation of several cold-curing compositions and the properties of cured products prepared therefrom.

Table 1

| Formulation and properties of one-component systems. | | |
|---|---|---|
| Formulation % | Example 5 | Example 8 |
| Product from Example | 60.9 | 66.4 |
| Polydimethylsiloxane oil (1,400 cP) | 22.7 | 26.1 |
| Ethyltriacetoxysilane | — | 4.3 |
| SiO$_2$ (200 m$^2$/g, loaded with (CH$_3$)$_2$SiCl$_2$) | 4.5 | 3.2 |
| Dibutyl-di-tin diacetate | 13 | 0.01 |
| Tetraisobutyl titanate | 5.3 | 13 |
| Dibutyl-tin dilaurate | 1.1 | — |
| Methyl-ethoxy-bis-[N-methyl-benzamido]-silane | 5.7 | |
| Properties | Example 5 | Example 8 |
| Modulus of elasticity DIN 53,504 Kp/cm$^2$ | 3.33 | 1.60 |
| Tensile strength DIN 53,504 Kp/cm$^2$ | 15.0 | 9.0 |
| Elongation at break DIN 53,504 in % | 526 | 476 |
| Shore A hardness DIN 53,505 | 17 | 8 |

Table 2

| Formulation and properties of two-component systems. | | | | |
|---|---|---|---|---|
| Formulation % | Example 5 | Example 8 | Example 5 | Example 8 |
| Product from Example | 100 | 100 | 50 | 50 |
| α, ω-Dihydroxy-polydimethyl-siloxane (2,000cP) | — | — | 50 | 50 |
| Tetraethyl silicate | 2 | 2 | — | — |
| Mixture of 97% of tetraethoxysilane and 3% of dibutyl-tin dilaurate | — | — | 6 | 6 |
| Properties | | | | |
| Tensile strength Kp/cm$^2$ | 170 | 100 | 93 | 73 |
| Elongation % | 310 | 280 | 150 | 160 |
| Shore A hardness | 32 | 24 | 34 | 28 |
| Elasticity % | 60 | 37 | 80 | 69 |
| Tear propagation resistance Kp/cm$^2$ according to: | | | | |
| ASTM 624 B | 4.74 | 4.34 | 1.74 | 2.34 |

Table 2-continued

Formulation and properties of two-component systems.

| Formulation % | Example 5 | Example 8 | Example 5 | Example 8 |
|---|---|---|---|---|
| ASTM 624 C | 7.73 | 6.21 | 3.14 | 3.25 |
| DIN 53,515 | 2.93 | 3.01 | 0.88 | 1.10 |
| Density g/cm$^3$ | 1.085 | 1.089 | 1.029 | 1.032 |

EXAMPLE 10

A solution of 35.7 g of dipropylene glycol, 8.9 g of trimethylolpropane and 76.5 g of the polymethylsiloxane of Example 1 in 150 g of dry toluene is warmed to 100° C. and a mixture of 0.4 g of triethylamine and 31.9 g of toluylene diisocyanate is added in the course of one hour. The mixture is stirred for a further hour at 100° C. and the solvent is then distilled off. The residue has a viscosity of 72,000 cP (20° C.). A cured film prepared therefrom according to Example 1 has a Shore A hardness of 16.

EXAMPLE 11

A mixture of 57.9 g of the toluylene diisocyanate of Example 1 and 0.3 g of triethylamine is added in the course of 0.5 hour, while stirring, to a mixture, which has been warmed to 80° C., of 100 g of the polydimethylsiloxane of Example 1, 40 g of dipropylene glycol and 2.1 g of glycerol. After the addition has ended, the mixture is stirred for a further 2 hours at 80° C. This gives a slightly yellowish crosslinkable composition with a viscosity of 220,000 cP (20° C.). A cured film prepared therefrom according to Example 1 has a Shore A hardness of 25.

EXAMPLE 12

The experiment of Example 3 is carried out except that but-2-ene-1,4-diol is used in place of dipropylene glycol.

A pale brown, homogeneous and crosslinkable product with a viscosity of 145,000 cP is obtained.

A cured film prepared therefrom according to Example 1 has a Shore A hardness of 17.

EXAMPLE 13

The experiment of Example 3 is carried out except that butane-1,4-diol is used in place of dipropylene glycol.

A white crosslinkable product with a viscosity of 143,000 cP is obtained.

A cured film prepared therefrom according to Example 1 has a Shore A hardness of 13.

EXAMPLE 14

The experiment of Example 3 is carried out except that propane-1,3-diol is used in place of dipropylene glycol.

A white crosslinkable composition which has a viscosity of 182,000 cP is obtained.

A cured film prepared therefrom according to Example 1 has a Shore A hardness of 13.

EXAMPLE 15

This example illustrates the preparation of a dispersion of 50% of a polyurethane based on toluylene diisocyanate and a polyester in the molar ratio of 1:0.9 and 50% of an α,ω-dihydroxypolydimethylsiloxane.

A solution of 100 g of a linear polyester based on adipic acid and ethylene glycol with a hydroxyl group content of 1.65% and 107.5 g of the polydimethylsiloxane of Example 1 in 200 g of toluene is warmed to 80° C. and a mixture of 7.6 g of the toluylene diisocyanate of Example 1 and 0.5 g of triethylamine is added to this solution in the course of one hour. After the mixture has been stirred for a further one hour at 80° C., a white crosslinkable product is obtained after distilling off the solvent.

EXAMPLE 16

A mixture of 1,500 g of the polydimethylsiloxane of Example 1, 909.5 g of dipropylene glycol and 1.5 g of ethylenediaminomethyldimethylethoxysilane is warmed to 80° C. and stirred for 1 hour. 800.6 g of the toluylene diisocyanate of Example 1 are now added at 80° C. in the course of one hour and the mixture is stirred for a further 2 hours at the same temperature. A white composition with a viscosity of 230,000 cP (20° C.) is obtained.

A cured film prepared therefrom according to Example 1 has a Shore A hardness of 16.

EXAMPLE 17

The experiment of Example 3 is carried out except that 0.06 ml of dibutyl-tin dilaurate is employed as the catalyst in place of triethylamine.

A white product with a viscosity of 185,000 cP is obtained.

A cured film prepared therefrom according to Example 1 has a Shore A hardness of 15.

It will be appreciated that the instant specification and examples are set forth by way of illustration and not limitation, and that various modifications and changes may be made without departing from the spirit and scope of the present invention.

What we claim is:

1. A process for producing a composition comprising a polysiloxane and a polyurethane each present as a discernible phase comprising mixing at a temperature from about room temperature to about 150° C. a liquid polysiloxane of the formula

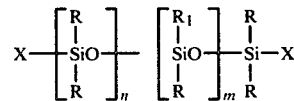

in which
R is an alkyl, alkenyl, aryl or halogenoalkyl radical with up to about 10 C atoms,
R' is hydrogen, or an alkyl, alkenyl, aryl or halogenoalkyl radical with up to about 10 C atoms,
X is hydroxyl, vinyl or methyl,
n is 2 to about 1,000, and
m is 1 to about 50,
the polysiloxane having a viscosity of the order of about 10,000 centipoise, with a material which with a polyisocyanate will form a polyurethane, thereafter adding to said mixture a polyisocyanate of the formula

in which
R$^1$ is an optionally substituted alkylene or arylene radical with up to 24 C atoms, thereby to form said polyurethane as a discernible phase in the liquid polysiloxane, the proportions of polysiloxane, polyurethane-forming material and polyisocyanate being such that the formed polyurethane constitutes about 40–80% of the weight of polysiloxane plus polyurethane.

2. The process according to claim 1, including the further steps of adding to the composition a curing catalyst for the polysiloxane, and allowing the composition to cure.

3. The product produced by the process of claim 1.

4. The product according to claim 3, wherein the polysiloxane is present as a continuous liquid phase and the polyurethane is present as a non-continuous phase of finely divided particles.

5. The product according to claim 3, wherein at least about 80% of the polyurethane particles have an average diameter of about 0.3 to 10 microns.

6. The product produced by the process of claim 2.